(12) United States Patent
Gedling et al.

(10) Patent No.: US 8,202,149 B2
(45) Date of Patent: Jun. 19, 2012

(54) FANTASY LEAGUE GAME AND MODEL

(76) Inventors: Steven Gedling, Louisville, KY (US); David Gedling, Clarksville, IN (US)

( * ) Notice: Subject to any disclaimer, the term of this patent is extended or adjusted under 35 U.S.C. 154(b) by 1097 days.

(21) Appl. No.: 12/029,736

(22) Filed: Feb. 12, 2008

(65) Prior Publication Data

US 2009/0203412 A1    Aug. 13, 2009

(51) Int. Cl.
*A63F 9/24* (2006.01)
*A63F 13/00* (2006.01)
*G06F 17/00* (2006.01)
*G06F 19/00* (2011.01)

(52) U.S. Cl. .................. 463/4; 463/42; 463/16; 463/9; 700/91; 345/473

(58) Field of Classification Search .................. None
See application file for complete search history.

(56) References Cited

U.S. PATENT DOCUMENTS

| | | | |
|---|---|---|---|
| 4,918,603 A | 4/1990 | Hughes et al. | |
| 5,846,132 A * | 12/1998 | Junkin | 463/42 |
| 6,102,797 A * | 8/2000 | Kail | 463/16 |
| 6,292,706 B1 * | 9/2001 | Birch et al. | 700/91 |
| 6,371,855 B1 * | 4/2002 | Gavriloff | 463/42 |
| 7,001,279 B1 | 2/2006 | Barber et al. | |
| 7,548,242 B1 * | 6/2009 | Hughes et al. | 345/473 |
| 7,988,560 B1 * | 8/2011 | Heller et al. | 463/42 |
| 2002/0107073 A1 | 8/2002 | Binney | |
| 2002/0115488 A1 | 8/2002 | Berry et al. | |
| 2004/0266530 A1 | 12/2004 | Bishop | |
| 2005/0064937 A1 | 3/2005 | Ballman | |
| 2005/0239549 A1 | 10/2005 | Salvatore | |
| 2006/0105827 A1 * | 5/2006 | Metzger et al. | 463/9 |
| 2006/0183548 A1 | 8/2006 | Morris et al. | |
| 2006/0217198 A1 | 9/2006 | Johnson | |
| 2006/0258421 A1 | 11/2006 | Nicholas et al. | |
| 2007/0060380 A1 | 3/2007 | McMonigle et al. | |
| 2007/0113250 A1 | 5/2007 | Logan et al. | |
| 2007/0293289 A1 * | 12/2007 | Loeb | 463/4 |
| 2008/0051201 A1 * | 2/2008 | Lore | 463/42 |
| 2009/0171901 A1 * | 7/2009 | Bathiche et al. | 707/3 |
| 2009/0203447 A2 * | 8/2009 | Hansen et al. | 463/42 |

* cited by examiner

*Primary Examiner* — Paul A. D'Agostino
(74) *Attorney, Agent, or Firm* — Waters Law Group, PLLC; Robert R. Waters; Brian W. Foxworthy

(57) ABSTRACT

A fantasy league model comprises at least one competitive affiliation having a plurality of affiliation members, at least one historical competitive season associated with the at least one competitive affiliation, the at least one historic competitive season formed from a plurality of individual competitions between affiliation members. The model further includes a plurality of rosters, each one of the rosters associated with one of the affiliation members in one of the historic competitive seasons, a plurality of competitors forming the plurality of rosters of one of the historic competitive seasons, and a plurality of statistical sets, each one of the statistical sets associated with a competitor identified on one of the rosters from at least one of the historic competitive seasons. Each one of the statistical sets is formed by the actual performance of one of the competitors from the individual competitions between affiliation members for the historical competitive season selected.

3 Claims, 2 Drawing Sheets

FANTASY LEAGUE GAME AND MODEL

RELATED U.S. APPLICATION DATA

Not applicable.

FIELD OF THE INVENTION

The embodiments and claims of this application generally relate to a fantasy league system, and, more specifically, to an improved fantasy league game and model by which historical statistical information is utilized to derive performance points for a team or franchise.

BACKGROUND OF THE INVENTION

Fantasy sports leagues and competitions are now a widespread amusement activity and a natural outgrowth of the increased presence and importance that athletic competitions have acquired in recent years. Fantasy leagues for a variety of sports are now available, especially via the Internet and sponsored by media sources, including ESPN, CBS, Yahoo! and other similar entities. In these fantasy leagues, a user may undertake several responsibilities, including that of owner, general manager and coach or manager. Each team or organization within a fantasy league includes a number of individuals that actually participate in the sports leagues upon which the fantasy leagues are based. Obviously, the fantasy league participants success or failure is intertwined with the success or failure of the individuals each participant selects for his or her fantasy league team.

A fantasy league and its participants are scheduled to compete so that the fantasy league season corresponds with the current athletic season for a particular sport. For example, at the moment of this application, most American football fantasy leagues were completed upon the completion of the National Football League (NFL) regular season for 2007. Similarly, a baseball fantasy league will utilize the players and statistics generated from the upcoming 2008 Major League Baseball (MLB) season. Likewise, professional basketball fantasy leagues are in the midst of their regular seasons corresponding with the current 2007-2008 National Basketball Association (NBA) regular season.

Current fantasy league models do not utilize historical information for determining performance and results of the participants' teams in a particular fantasy league. Thus, the current fantasy league models generally begin and conclude a fantasy league season approximately contemporaneous to the actual athletic season, and fantasy league amusement for that particular sport is delayed for several months until the next athletic season begins.

Accordingly, it is desirable to provide a fantasy league model by which the fantasy league and each one of the member's performance is based on historical statistics taken from previous seasons, as opposed to the contemporaneous season on which fantasy league models are based. To applicant's knowledge, there is no other fantasy league model utilizing such historical statistics, thereby permitting unorthodox and out-of-season fantasy league schedules, among several possibilities.

SUMMARY OF THE INVENTION

In one embodiment, a fantasy league model is disclosed, the model comprising at least one competitive affiliation having a plurality of affiliation members, at least one historical competitive season associated with the at least one competitive affiliation, the at least one historic competitive season formed from a plurality of individual competitions between affiliation members. The model includes a plurality of rosters, each one of the rosters associated with one of the affiliation members in one of the historic competitive seasons, a plurality of competitors forming the plurality of rosters of one of the historic competitive seasons, and a plurality of statistical sets, each one of the statistical sets associated with a competitor identified on one of the rosters from at least one of the historic competitive seasons. Each one of the statistical sets may be formed by the actual performance of one of the competitors from the individual competitions between affiliation members for the historical competitive season selected. An interface may be included permitting a plurality of users to form a plurality of franchises. Each one of the franchises populated by one of the users selecting one or more competitors from one of the plurality of rosters, at least one of the franchises selected to compete against at least one of the remaining franchises in head-to-head competition. Franchise performance formulated from the actual performance of each one of the selected competitors of each one of the franchises selected into a cumulative franchise score for each one of the franchises selected for head-to-head competition, the respective cumulative franchise scores compared to determine a head-to-head winner.

In an embodiment disclosing a fantasy league system, the system comprises means for generating at least one historic competitive season from at least one competitive affiliation, means for permitting each one of a plurality of users to form a fantasy league franchise, means for selecting at least one competitor from a plurality of competitors from the at least one historic competitive season for inclusion in one of the user's franchises, means for determining the performance of each one of the competitors selected by one of the user's franchise for participation in a competition between a first franchise and second franchise, and means for identifying the superior performance between the first franchise and the second franchise.

In another embodiment, encompassing a method for conducting a fantasy league, and that may be achieved by machine-readable media performing the method, wherein the method comprises generating at least one historic competitive season from at least one competitive affiliation; permitting each one of a plurality of users to form a fantasy league franchise; selecting at least one competitor from a plurality of competitors from the at least one historic competitive season for inclusion in one of the user's franchises; determining the performance of each one of the competitors selected by one of the user's franchise for participation in a competition between a first franchise and a second franchise; and identifying the superior performance between the first franchise and the second franchise.

As discussed above, the method and device of the present invention overcomes the disadvantages inherent in prior art methods and devices. In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Accordingly, those skilled in the art will appreciate that the conception upon which this invention is based may readily be utilized as a basis for the design of other structures, methods, and systems for carrying out the several purposes of the present invention. It is important, therefore, that the claims be regarded as including such equivalent constructions insofar as they do not depart from the spirit of the present invention.

Furthermore, the purpose of the foregoing Abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The Abstract is neither intended to define the invention of the application, nor is it intended to be limiting to the scope of the invention in any way. It is intended that the application is defined by the claims.

DETAILED DESCRIPTION OF THE EMBODIMENT(S)

Figure 1:
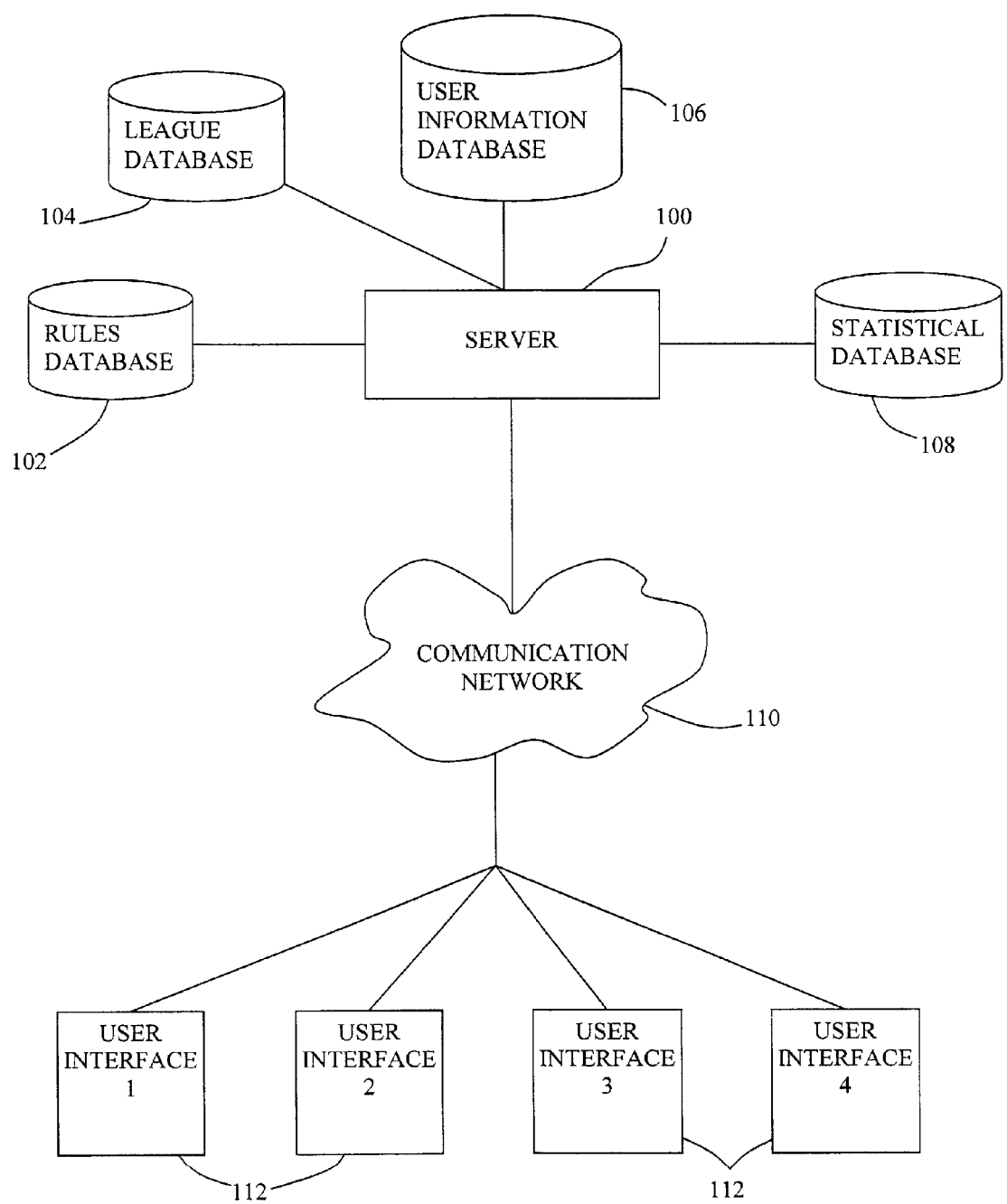
FIG. 1 is a diagram of an electronic platform used for implementing the fantasy league game or model disclosed herein.

The detailed description below is provided in at least one embodiment, and possibly multiple embodiments, and is intended to be illustrative, but not exhaustive. It is to be understood that a variety of other arrangements are also possible without departing from the spirit and scope of the present invention.

In accordance with the embodiments disclosed herein, a fantasy sport(s) and/or entertainment league game, model system(s) and method(s) are described, hereinafter generally referred to as a fantasy league game or model. The game, system(s) and/or method(s) evaluate participant performance based on the historical statistics of a selected season, calendar year, affiliation year or other selected window of time. The historical statistics are exclusive of any contemporaneous or concurrent season, calendar year, affiliation year or other selected window of time. Thus, the embodiments disclose and describe the use of historical statistics, information and records that do not interfere with or compete against fantasy league models based on contemporaneous real-time performances and statistics. For example, if a group of users wants to form a fantasy league in accordance with the disclosure and description of the embodiments provided herein, and the general date is December 2007, then the specific fantasy league may include the 2007 MLB season and all seasons prior to for all real sports organizations or affiliations, but would exclude the current NFL season (2007-08) and the current NBA season (2007-08) since neither the current NFL nor the current NBA season has concluded.

The fantasy league game or model disclosed herein may comprise one or more scoring systems, including straight point systems, rotisserie systems, head-to-head systems, or other available alternatives or combinations of the disclosed systems. The scoring system utilized may be tailored to accommodate a specific sport, event or activity, and is not restricted to a universal system.

It is to be understood that the disclosed embodiments, and anticipated variations of the disclosed embodiments, may be readily applied to several applications, including the use of the fantasy league game or model within "paper" leagues, or in "electronic" leagues, respectively. In "electronic" league applications, it is envisioned that personal video game platforms, video console platforms, and/or online video gaming platforms may be utilized as a basis for providing the necessary interaction between commissioner/manager, franchise owner, user or participant and the respective members of the fantasy league. Thus, it is understood that any suitable software, hardware, or combination thereof, may be used in conjunction with the various platforms to present the game or model for use and enjoyment.

Though all forms of implementation are envisioned, and by way of example only, the disclosed embodiments will generally discuss implementation of the game or model in an electronic format, such as video game platforms or online gaming platforms, among other possibilities. Therefore, in accordance with this illustration, the game or model may be implemented or accessible partially or entirely from one or more servers 100 operatively coupled to and communicative with a plurality of databases 102, 104, 106 and/or 108, respectively, storing the information necessary for operating a fantasy league game or model in accordance with the description provided herein. The database(s) 102-108 may be integrated or segregated, depending upon the infrastructure available. It is anticipated that the game or model may comprise a plurality of databases for storing information such as rules, user information, statistical information used in the assigned scoring system, and statistical information used in the tabulation and cataloging of fantasy league franchise competition results. The server is coupled to a communication network 110 that permits the transmission of relevant information from the databases to the user(s) or participant(s) requesting the information or selecting to interact with the fantasy league server. It is anticipated that a user or users may access the game or model through the communication network 110 via a user interface 112, which may include local or remote interface devices, such as hand controllers coupled to a video console, or via keyboard or mouse coupled with a computer interconnected with the network 110.

It is anticipated that the plurality of users forming a specific fantasy league may establish the particular format through internal negotiation or agreement, or in the alternative, via the selection of installed formats available from a menu. Format decisions may include the number of franchises or participants, roster limit of each franchise, competition format (head-to-head or cumulative scoring), post-season options (tournament), use of salaries or values in player evaluations and/or the use of salary or value caps per position or franchise, scoring system, and other operational rules or procedures that are typical or standard for a fantasy league.

Figure 2:
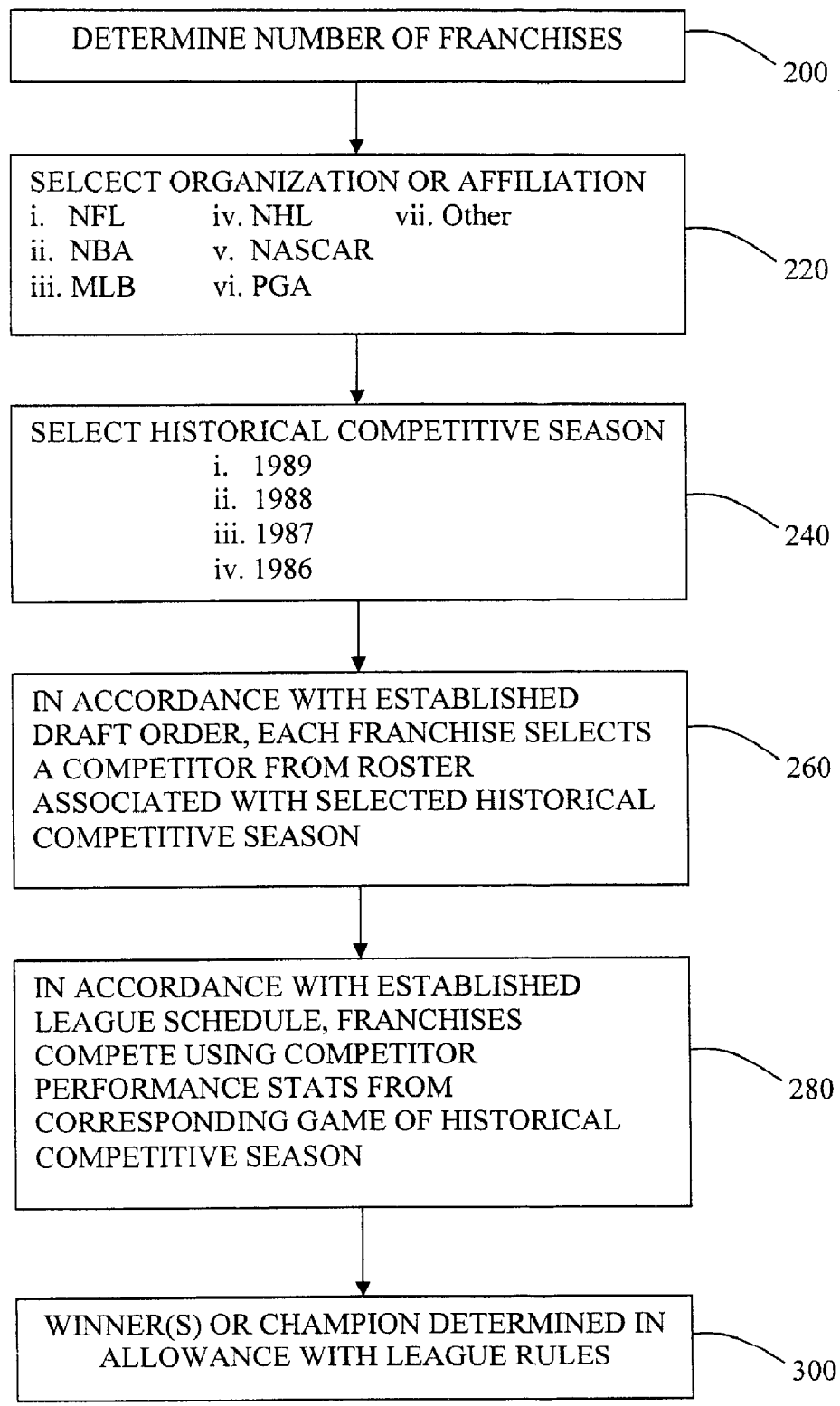
FIG. 2 is a block diagram of one method for performing or using the fantasy league game or model disclosed herein.

In one embodiment, as depicted in FIG. 2, the users may determine the number of franchises or teams to be included in the fantasy league 200. The users may select from one of a variety of competitive affiliations 220, which may include professional athletic organizations or amateur athletic organizations. Professional athletic organizations may include recognized entities such as MLB, the NFL, the NBA, the National Hockey League (NHL), the Major Soccer League (MLS), the Professional Golfers' Association (PGA), the Ladies Professional Golf Association (LPGA), the National Association of Stock Car Auto Racing (NASCAR), Association of Tennis Professionals (ATP), and may further include professional entities that are the foreign equivalent to these recognized entities, such as the Canadian Football League (CFL) as a foreign equivalent to the NFL, as but one example. Similarly, amateur athletic organizations may include entities such as the NCAA or the NAIA, and may further include sponsored sports and events such as NCAA football and NCAA basketball, among the many sports sponsored by these entities.

After selection of the appropriate or desired competitive affiliation, the users may select from one of a variety of historical competitive seasons 240. The historical competitive seasons may be identified by a historical year (e.g. the 1980 season for MLB; the 1980-1981 season for NFL). Identifying the historical year may provide an advantage to one or more users in the league, especially if the user(s) is familiar with the superlative performances of the respective teams or team members. In another embodiment, to reduce such an advantage, the historical year may be replaced by an alias (see the example below) comprising an alpha-numeric identification or a pseudonym generated to disguise the historical year from the users.

After selection of the historical competitive season, a roster associated with the historical competitive season is provided or generated. The roster comprises a plurality of individual competitors that competed in games, matches or events and for which relevant statistical information was collected. Each competitor in a specific historical competitive season will have an associated set of statistical information corresponding to the actual in-game, or in-competition, performances achieved by the competitor during the historical competitive season selected. Each one of the users or participants will draft competitors from the roster 260, in an agreed-upon order and manner, until the minimum or maximum roster limit is achieved, or alternatively, until the individual user or participant reaches the agreed-upon salary or competitor value cap.

The individual competitors comprising a roster from a historical competitive season may be identified in a variety of manners, and as agreed upon by the users forming the fantasy league. For example, the individual competitors may be identified in accordance with standard protocol, including name, number, position and team. Additionally, the individual competitor's performance statistics from the selected historical competitive season may be revealed in association with the name, number, position and team. Alternatively, the individual competitors may be identified by an alias comprising an alpha-numeric identification or a pseudonym generated to disguise the individual competitor's true identity from the users. As with disguising the historical competitive season described above, disguising individual competitor identities may reduce or eliminate the advantage(s) gained by one or more users that may be familiar with the performance of one of the individual competitors from the selected historical competitive season. Also, as another alternative, in addition to having an assigned alias for each competitor, the associated performance statistics may be replaced by a performance value as determined by an outside value system, or by a commissioner of the fantasy league, or another suitable and similar alternative. The performance value may be stated in denominations agreed upon by the users, which may include monetary amounts or other proprietary point value systems.

The statistical databases store and maintain statistical information associated with the historical records necessary to support the fantasy league game or model described herein for a defined period of time, which may be expanded or contracted based on user preferences. In one broadly encompassed embodiment, the game or model may comprise a database or databases storing information and statistics for a plurality of the professional and/or amateur athletic organizations that operate domestically and in foreign markets. For each affiliation or organization, additional information and statistics are stored and maintained, such as historical statistics for each competitor of a particular affiliation or organization over the course of a number of years or seasons. For example, in an NFL-based fantasy league, the database(s) may store information for the seasons from 1970 through 2006, including cumulative, weekly and other sortable statistical information for each competitor in each of the seasons from 1970 through 2006.

In a fantasy league utilizing a head-to-head competition format, in which a pair of franchises play a game or engage in a match per a defined schedule 280, each franchise owner or manager selects the individual competitors forming the team for that game or match according to the rules and format set by the fantasy league participants or the fantasy league commissioner. The competitors selected to compete on behalf of the fantasy league franchise for a game or match are evaluated based on the actual performance of each competitor as reflected in the associated statistic set for each competitor derived from a predetermined game or match. For example, in an NFL-based fantasy league, if Player No. 001 is selected to participate in Franchise A's first scheduled game, then the relevant statistics used for scoring in this particular league are drawn from the actual performance statistics compiled by Player No. 001 in Week 1 of the relevant historical competitive season. Likewise, if Player No. 001 is selected to participate in Franchise A's second scheduled game, then the relevant statistics used for scoring are drawn from the actual performance statistics compiled by Player No. 001 in Week 2 of the relevant historical competitive season.

EXAMPLE

NFL-Based Fantasy League

A group of users have agreed to form a fantasy league. In accordance with the description disclosed above, the users determine the number of franchises or teams that will compete in the fantasy league (e.g. eight franchises or teams). Thereafter, the users select one of the competitive affiliations available (e.g. users select the NFL). Next, the users select from a list of historical competitive seasons (e.g. 1989). Then, in accord with the agreed-upon draft order, the users select individual competitors from the roster generated associated with the historical competitive season selected by the users. For example, in the aggregate, the franchises may have selected competitors identified by Player Identification No. (PIN) (or, alternatively, the individual identities of the competitors may be available). More specifically, in an eight team league, the selections may comprise:

Franchise A—roster: PIN 1989-001 through PIN 1989-010

Franchise B—roster: PIN 1989-011 through PIN 1989-020

Franchise C—roster: PIN 1989-021 through PIN 1989-030

Franchise D—roster: PIN 1989-031 through PIN 1989-040

Franchise E—roster: PIN 1989-041 through PIN 1989-050

Franchise F—roster: PIN 1989-051 through PIN 1989-060

Franchise G—roster: PIN 1989-061 through PIN 1989-070

Franchise I—roster: PIN 1989-071 through PIN 1989-080

In a fantasy league utilizing head-to-head competition between the franchises on a week-to-week basis (corresponding to the NFL week-to-week schedule from the selected historical competitive season), the league commissioner or manager (or the franchise owners collectively) will formulate a competition schedule and then begin playing competitive games in accordance to that schedule. For purposes of example only, assume that the first game of the schedule comprises Franchise A competing against Franchise B based on the first week of NFL games from the 1989 season (as used in the examples above). Collectively, the league will have access to the weekly statistics compiled. The statistics of the selected competitors from each one of the Franchises (A and B) is extracted from the statistics available for the selected week. The assigned point values are then utilized to generate a cumulative point or score total for each competitor, and the aggregate point or score total for each franchise or team is tabulated therefrom. The aggregate point or score totals for each respective Franchise (A and B) are tabulated and compared, and a head-to-head winner is determined for that game 300. Each competitive week progresses accordingly, with each franchise generating an aggregate point or score total, with a head-to-head winner determined for each game of that week. The season and any post-season competition(s) are carried out in a similar manner. Thus, the schedule (regular season and any post-season games or tournament) may be summarized in the following example:

Fantasy Football League 2008

Fantasy Week 1 (Games 1-4)—Statistics from NFL Week 1 from the 1989 Season

Fantasy Week 2 (Games 5-8)—Statistics from NFL Week 2 from the 1989 Season

Fantasy Week 3 (Games 9-12)—Statistics from NFL Week 3 from the 1989 Season

Fantasy Week 4 (Games 13-16)—Statistics from NFL Week 4 from the 1989 Season

Fantasy Week 5 (Games 17-20)—Statistics from NFL Week 5 from the 1989 Season

Fantasy Week 6 (Games 21-24)—Statistics from NFL Week 6 from the 1989 Season

Fantasy Week 7 (Games 25-28)—Statistics from NFL Week 7 from the 1989 Season

Regular Season Ends

Fantasy Week 8 (Playoff Games 1 & 2)—Statistics from NFL Week 8-1989 Season

Fantasy Week 9 (Playoff Game 3)—Statistics from NFL Week 9-1989 Season

Fantasy Season Ends

Champion Determined

It is envisioned that an additional feature of the fantasy league model includes the incorporation of licensed audio and/or video replay or highlights of the individual competitors, if desired. For instance, in a fantasy league similar to that disclosed in the example above, in which the individual competitor or player identities are disclosed and known to the franchises, licensed audio and/or video of the individual competitor(s) in each game may be linked and queued during a fantasy league game. In one envisioned embodiment, utilizing a video gaming console or an Internet-based version incorporating audio and/or video interaction with the franchise owners or participants, the fantasy league game may be formatted so that each game may be simulated and the performance "highlights" of each competitor may be "simulated" and displayed for the participants. For example, if Franchise A selects and uses running back Barry Sanders, and for the selected week Barry Sanders generated satisfactory statistics and points for the franchise, the stored or remotely accessible audio and/or video files may be imported or displayed reflecting a highlight play or plays of Barry Sanders (though not necessarily from that exact week or against the exact competition). In providing this feature, it is anticipated that the interaction achieved will heighten the enjoyment of participation. Additionally, depending upon the age(s) of the participant(s), the audio and/or video file display feature may aid in the education of younger or unfamiliar participants with professional players or competitors from a different era or generation. Alternatively, in an embodiment in which licensed audio and/or video is not used or desired, audio and/or video files may be accessed that generate generic plays according to position and results, and are coordinated with any team color(s) and/or logo(s) utilized.

In another embodiment, in an interactive electronic version of the implemented fantasy sports or entertainment league model, the user(s) may be required to tabulate and input the proper scoring results based on the performance of the competitors comprising each franchise or team. It is envisioned that such a variation may be best utilized with school-age children, though not limited thereto. By encouraging the user(s) to tabulate and input the scoring results, the game or model encourages the exercise of mathematic skills. In school-age children, and especially in early educational development, active and interactive utilization of mathematic skills in atypical environments takes the focus off of the task of learning and places the focus on application of acquired knowledge. Creating a fun learning environment, especially in a subject such as mathematics, generates interest and a better method of learning.

It is envisioned that the description of the embodiments and the claims, and any variants thereof, encompass a variety a applications and implementations and may be embodied in sequences of instructions stored on machine-readable media (e.g., one or more fixed disks, removable media such as compact discs (CDs) or digital versatile discs (DVDs), random-access or read only memories, or any combination thereof, at a single location, on a single machine, or distributed across a network). When executed by a machine such as a computer system, the sequences of instructions then cause the machine to perform the actions of the method disclosed herein (e.g. FIG. 2). By way of example, the machine which executes the sequences of instructions may be a system-on-a-chip (SOC) tester. It is envisioned that a machine-readable medium (automated data medium) is a medium capable of storing data in a form that can be accessed by an automated sensing device. Machine-readable media may include one or more of the following, but not limited to, (a) magnetic disks, cards, tapes, and drums, (b) punched cards and paper tapes, (c) optical disks, (d) bar-codes and (e) magnetic ink characters.

It is also envisioned that the game or model may be in the form of an application or may be implemented so that the aggregate information comprises data structure stored in memory and accessible upon request or command, including but not limited to, an array, a table, a database, a stack, a heap, a linked list, a heap and a data cube. The data structure(s) may be stored in any of the aforementioned media, including disks within a video game console, disks within a computer or server, and remote disks stored on other consoles, computers or servers, among the variant possibilities.

What is claimed is:

1. A non-transitory computer-readable media encoded with computer-readable instructions and storing a model executed by a computer connected to a processor allowing input of operational data and causing the computer to function as a fantasy league game, the fantasy league game comprising:
 data of at least one historical competitive season of at least one historical competitive affiliation having a plurality of historical affiliation members, said data comprising:
 the historical affiliation members, a roster of historical competitors from each of said members, the schedule of historical competitions between said members during said at least one historical competitive season, and statistical sets recorded for said competitors on said rosters for each of said competitions in said competitive season in which said competitors participated; said at least one historical competitive season comprising a season not including a currently active competitive season;

a set of operational fantasy league rules, said operational rules permitting a plurality of users to select which of said operational rules to apply for said fantasy league game;

said operational rules permitting said plurality of users to form a plurality of franchises, each one of said franchises populated by user inputted selections of one or more of said historical competitors from said historical rosters from the corresponding said historical competitive season, each of said historical competitors being available to only one franchise at a time;

said operational rules providing scheduling of competitions between said franchises;

said operational rules allowing said plurality of users to select specific ones of said historical competitors for said competitions between said franchises; and said operational rules providing scoring of said competitions between said franchises by referencing said statistical sets recorded for said specific ones of said historical competitors to determine how said specific ones performed in said corresponding competitions in said historical competitive season and applying said selected fantasy league rules.

2. The non-transitory machine-readable media of claim 1, wherein said operational rules providing scheduling of a series of competitions between said franchises to create a fantasy league season, and scoring of each of said competitions between said franchises by referencing said statistical sets recorded for said specific historical competitors to determine how said competitors performed in corresponding historical competitions in said corresponding historical competitive season and applying the selected fantasy league rules.

3. The non-transitory machine-readable media of claim 1, wherein said operational rules providing scheduling a post-season tournament based on the results of said fantasy league season and said selected fantasy league rules.

\* \* \* \* \*